Dec. 31, 1968          J. HUC          3,419,768

CERAMIC CAPACITOR

Filed July 20, 1967

INVENTOR
JEAN HUC

BY Paul M. Craig, Jr.
ATTORNEY

United States Patent Office 3,419,768
Patented Dec. 31, 1968

3,419,768
CERAMIC CAPACITOR
Jean Huc, Bagneres-de-Bigorres, France, assignor to Compagnie Generale d'Electro Ceramique, Paris, France
Filed July 20, 1967, Ser. No. 654,723
Claims priority, application France, July 20, 1966, 70,182
7 Claims. (Cl. 317—242)

ABSTRACT OF THE DISCLOSURE

A power ceramic capacitor comprising two metal layers deposited respectively on the outer and on the inner surfaces of a ceramic tube having radially extending end portions, the junction of said end portions with said outer surface being provided with a groove, which groove comprises a concave portion facing a part of said outer surface to form a sharp annular edge.

---

The present invention relates to ceramic capacitors, and more particularly to power capacitors essentially comprising a ceramic tube the inner and outer surfaces of which are covered by metal layers. Such capacitors, intended for use at high voltage, are usually provided with a reinforced ceramic end portion for increasing the brush discharge voltage.

The object of the present invention is to provide an improved capacitor presenting a much higher brush discharge voltage than heretofore attainable by known capacitor constructions. According to the invention, this object is accomplished by providing a ceramic capacitor which comprises a reinforced end portion having a groove whose particular shape and construction increases the brush discharge voltage.

The capacitor construction provided in accordance with the invention comprises two metal layers deposited respectively on the inner and the outer surfaces of a ceramic tube having reinforced end portions within each of which there is provided a groove, one portion of the surface of this groove extending transverse to the outer surface of the tube, the other portion of the groove comprising a concave portion facing a part of the outer surface of the tube.

According to another feature of the invention, the abovementioned concave portion is extended by a convex portion, with the line of separation between these two portions defining a sharp edge.

According to another feature of the invention, the intersections of the planes tangent to said concave and convex portions along the edge with the axis of said tube and the bottom of said groove are located on either side of the plane, perpendicular to said axis, defined by said edge. These and other objects, features and advantages of the present invention will now be described with reference to the accompanying drawing which illustrate several embodiments of the present invention, and wherein.

Figure 1:
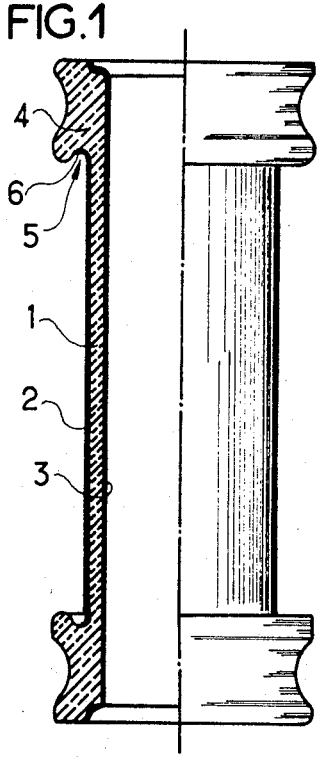
FIGURE 1 is a partial sectional view of a known capacitor.

FIGURE 1 shows a capacitor formed by metal layers 2 and 3 deposited respectively on the outer and the inner surfaces of a ceramic tube 1. It is known that the maximum admissible voltage across the terminals of such a capacitor can be increased by the provision of reinforced or enlarged end portions, such as shown at 4, comprising a groove 5 extending the outer cylindrical surface of the tube 1. The provision of such a groove results in an improvement of the distribution of the field lines at the edges of the capacitor, thereby increasing the brush discharge voltage.

Thus, in the case of a capacitor as described above and formed by a tube made of a ceramic material having a permittivity $K=75$, an outer diameter $d=56$ mm., an inner diameter $e=7$ mm. and a thickness of the reinforced portion $$f=\frac{98-70}{2}=14 \text{ mm.}$$

one can apply a voltage of some 12 kilovolts without appearance of brush discharges.

Experiments show that it is very important to manufacture capacitors such that the metal layer 2 presents a perfectly rectilinear and well cut edge. This is very difficult to achieve, because the metal layer is usually obtained by baking a layer of metallizing paint, which is generally deposited on the outer surface of the tube 1 by means of a brush, which method makes it extremely difficult to obtain perfect edges. Experiments also show that a continuous surface covered by a metallizing layer presents, in the vicinity of the edge of this layer, tangential field lines which facilitate the formation of the brush discharge.

Figure 2:
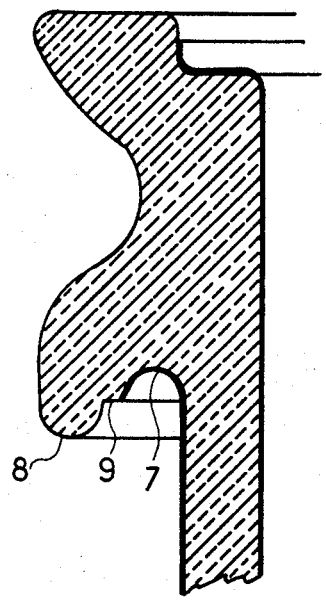
FIGURE 2 is a sectional view of a portion of another known capacitor.

Taking into account the abovementioned considerations, the invention proposes a modification of the profile of the groove to obtain the profile shown in FIGURE 2. As illustrated in this figure, showing a magnified view of the reinforced or enlarged end portion of a capacitor, the cross-section of the groove comprises a semicircular portion 7 connected to the rounded-off portion 8 by a radial surface portion 9. The intersection of the portion 7 with the segment 9 defines a rugged or sharp edge which makes it easier to obtain a perfectly edged metal layer. Furthermore, it has been observed that the capacitor of FIGURE 2 presents a lower density of tangential field lines since more lines penetrate the ceramic tube. A capacitor according to FIGURE 2, and having the same dimensions as that of FIGURE 1, presents a brush discharge voltage increased up to 16 kilovolts.

Figure 3:
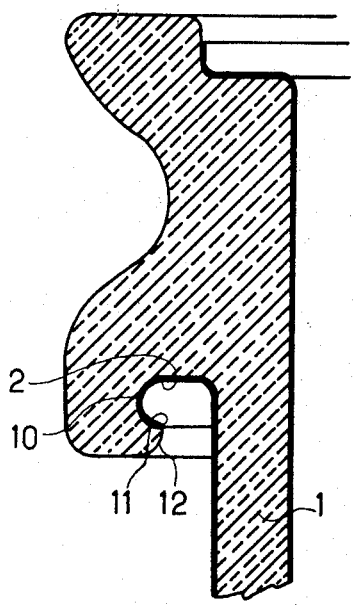
FIGURE 3 is a similar view of a first capacitor according to the invention.

FIGURE 3 is a sectional view of the end portion of a capacitor according to another embodiment of the present invention. The profile of the groove is characterized by a concave surface 10 facing the cylindrical portion of the ceramic tube and separated therefrom by a radial surface portion. The surface 10 joins a convex surface 12 formed by the terminal portion of the reinforced or enlarged end portion, thus defining a sharp edge 11. The metal layer 2 extends in the groove up to the edge 11.

Preferably, the concave surface 10 is such that the planes tangent to this surface along the edge 11 cut the axis of the cyindrical tube 1, at the side opposite to that of the bottom of said concave portion, with respect to the plane defined by said edge 11. A capacitor having a configuration according to FIGURE 3 presents an improved behavior, when used at high frequency voltage. As shown in FIGURE 3, the bottom of the groove 10 can be planer. A capacitor having the dimensions of the capacitor of FIGURE 1 and the structure of that illustrated in FIGURE 3 can have a brush discharged voltage increased up to 20 kilovolts.

Figure 4:
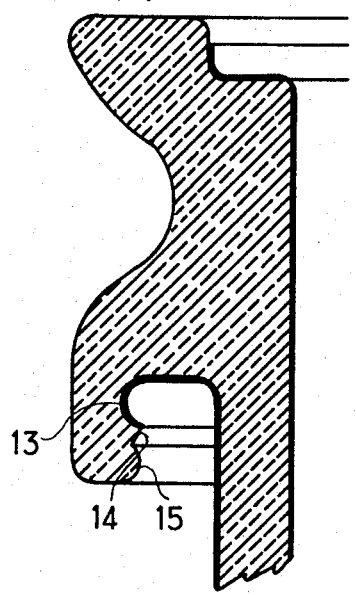
FIGURE 4 is the same view of another embodiment of the present invention.

However, it is to be noted that, in the case of FIGURE 3, the space between the edge 11 and the cylindrical surface 2 is reduced and the drilling of the groove is difficult to carry out. This drawback is obviated by the structure illustrated in FIGURE 4. As shown by this figure, the groove comprises a concave surface 13 (corresponding to portion 10 of FIGURE 3) connected to a convex surface 15 (corresponding to portion 12 of FIGURE 3) by a conical portion 14. The surfaces 13 and 14 define a sharp edge similar to the edge 11 of FIGURE 3. The distance between the cylindrical part of the layer 2 and the nearest point of the convex surface 15 is substantially equal to the distance between this cylindrical portion and the edge defined by the surfaces 13 and 15. With a capacitor according to FIGURE 4, and having the characteristics disclosed with reference to FIGURE 1, it is possible to obtain a brush discharge voltage as high as 25 kilovolts.

The present invention is in no way limited to structures specifically described and illustrated in the present specification and drawings, and many minor changes can be made without departing from the scope of the invention.

I claim:

1. A power capacitor comprising a ceramic tube having radially extending end portions, two metal layers deposited respectively on the outer and on the inner surfaces of said ceramic tube, the junction of said end portions with said outer surface of said tube being provided with an annular groove, said groove comprising a concave portion facing a part of said outer surface of said ceramic tube, one flank of said groove extending substantially transversely to said outer surface.

2. Capacitor according to claim 1, wherein the other flank of said groove is continued by a convex surface, the separation line between said concave portion and said convex surface defining a sharp edge.

3. Capacitor according to claim 2, wherein the intersection of the planes tangent to said concave portion along said edge with the axis of said tube and the bottom of said groove is located at either side of the plane, perpendicular to said axis, defined by said edge.

4. Capacitor according to claim 2, wherein the metal layer of said outer surface extends in said groove to said edge.

5. Capacitor according to claim 2, wherein said concave portion and said convex portion are separated by a conical portion defining therewith two sharp edges.

6. Capacitor according to claim 5, wherein the metal layer of said outer surface extends in said groove to the sharp edge defined by said concave and said conical portions.

7. Capacitor according to claim 5, wherein the distance between said outer surface and the point of said convex portion which is the nearest to said outer surface, is substantially equal to the distance between said outer surface and the sharp edge defined by said concave portion and said conical portion.

References Cited

German printed application No. 1,035,774, published May 11, 1957, to Philips.

LEWIS H. MYERS, *Primary Examiner.*

E. GOLDBERG, *Assistant Examiner.*

U.S. Cl. X.R.

174—140